(No Model.) 2 Sheets—Sheet 2.
W. H. & T. B. LAYCOCK & T. McCRANN.
SPRING BED BOTTOM.
No. 250,044. Patented Nov. 22, 1881.
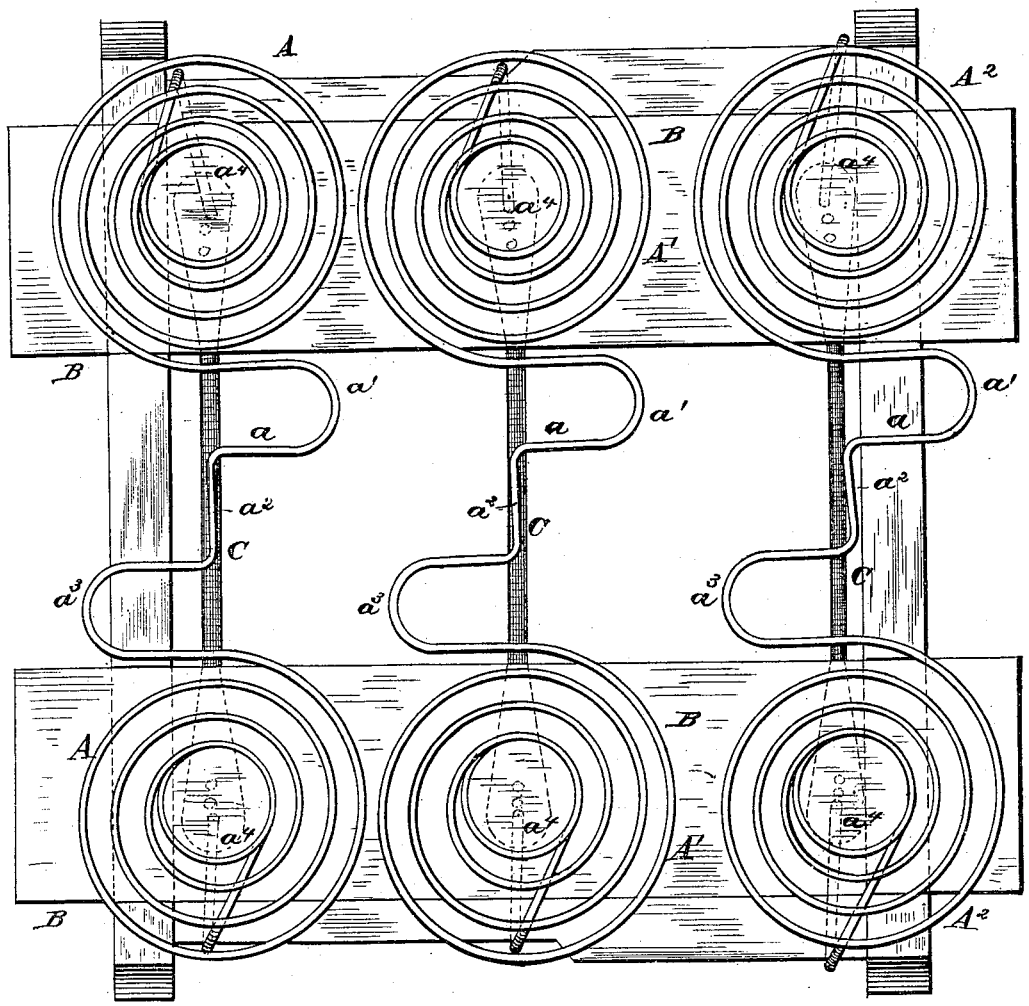

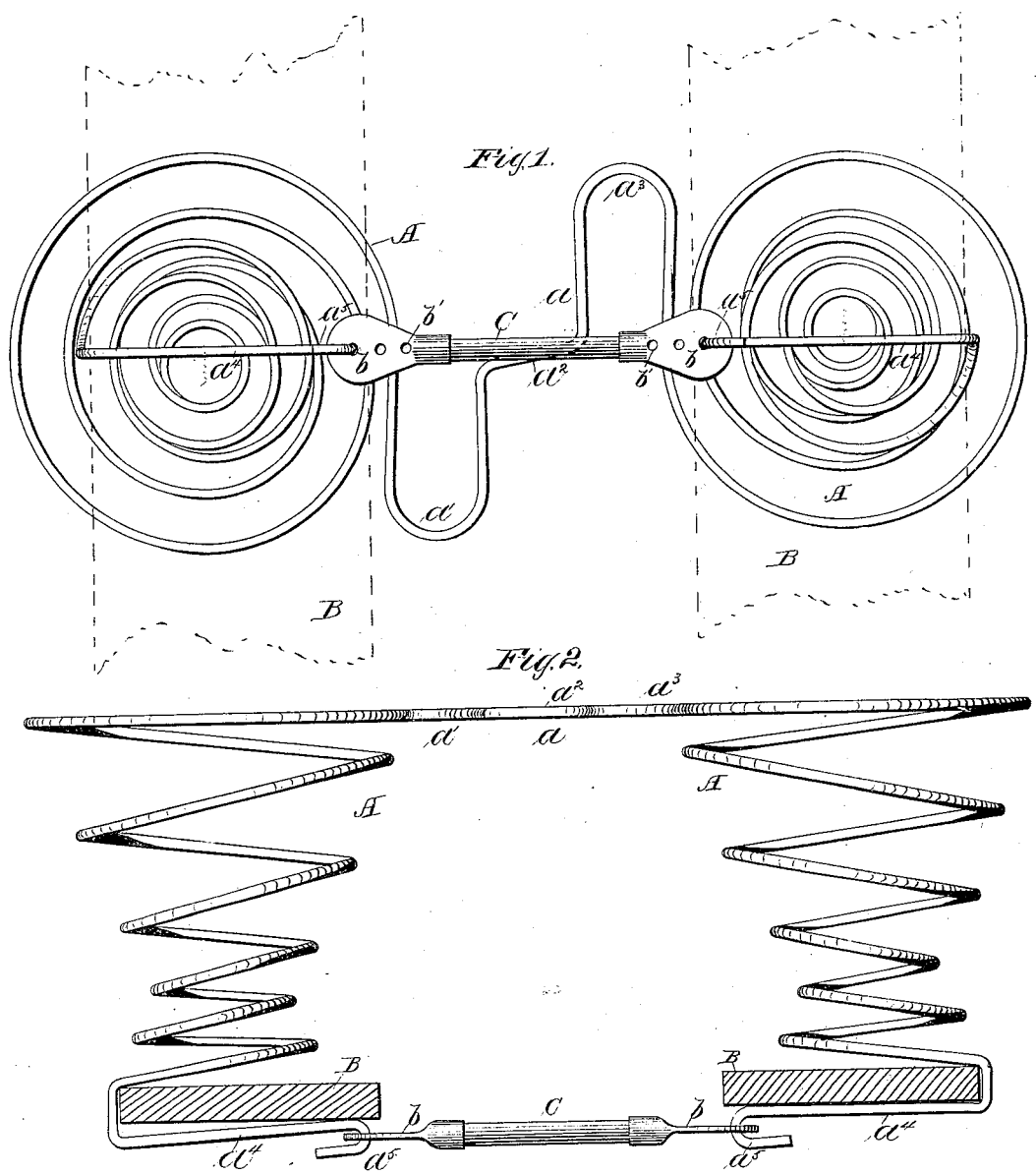

UNITED STATES PATENT OFFICE.

WILLIAM H. LAYCOCK, THOMAS B. LAYCOCK, AND THOMAS McCRANN, OF WASHINGTON, INDIANA.

SPRING BED-BOTTOM.

SPECIFICATION forming part of Letters Patent No. 250,044, dated November 22, 1881.

Application filed October 20, 1881. (No model.)

*To all whom it may concern:*

Be it known that we, W. H. LAYCOCK, T. B. LAYCOCK, and T. McCRANN, citizens of the United States, residing at Washington, in the county of Daviess and State of Indiana, have invented certain new and useful Improvements in Spring Bed-Bottoms, of which the following is a specification, reference being had therein to the accompanying drawings.

Figure 1 is an inverted plan view of our improved spring bed-bottom. Fig. 2 is a view in elevation, showing the manner of connecting together the lower ends of a pair of springs; and Fig. 3 is an inverted plan view, showing adaptation of the springs to bed-slats of varying distances apart and width.

This invention has relation to an improvement in spring bed-bottoms, its object being to render the springs capable of adjustment to slats different distances apart, to prevent the slipping of the springs from the slats, and to adapt their connecting together fastenings or means to secure them upon the slats, placed near together or spread apart; and it consists of the construction of spring and other parts combined therewith, substantially as hereinafter more fully set forth and claimed.

Referring to the accompanying drawings, A A indicate a pair of springs, which are duplicate at A' and $A^2$. The springs A are connected together at their upper ends by the bridge $a$, which is a continuation of the wire of which the springs themselves are made. The bridge is formed with a number of bends, $a'$ $a^2$ $a^3$, (more or less,) after the manner of steps, arranged in a horizontal plane, and beginning at a point about in a line with one side of one spring and ending at a point about in a plane with the opposite side of the other spring of the pair. It will be noticed that this form of bridge, primarily for holding the pair of springs from careening and to enable one to strengthen the other, permits of their being arranged farther apart or brought nearer together, which enables them to be adapted to slats varying distances apart or of different widths. This is a great desideratum when it is considered that the slats of two beds are seldom of the same size or placed equal distances apart. The lower ends of the springs are seated upon the slats B B, with their extremities extended thereunder, as at $a^4$, and formed with hooks $a^5$.

C is an elastic connection, the ends of which are provided with inelastic pieces $b$, having slits or apertures $b'$ to receive the hooks $a^5$ of the springs to effect the connecting together of the lower ends of the springs and to prevent the possible slipping of the springs off the slats. By reason of its elasticity the connection C is capable of connecting the springs together, whether placed close together or far apart.

We claim and desire to secure by Letters Patent—

The combination, with springs A and the bed-slats, of the elastic connection or fastening C, adapted to be connected to the lower ends of said springs, substantially as and for the purpose set forth.

In testimony whereof we affix our signatures in presence of two witnesses.

WILLIAM H. LAYCOCK.
THOMAS B. LAYCOCK.
THOMAS McCRANN.

Witnesses:
LEWIS F. SELF,
H. V. SAVIER.